US006639200B2

(12) United States Patent
Chen

(10) Patent No.: US 6,639,200 B2
(45) Date of Patent: Oct. 28, 2003

(54) PAPER CURRENCY RECOGNITION SYSTEM

(75) Inventor: Hung-Ta Chen, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 30 days.

(21) Appl. No.: 09/985,576

(22) Filed: Nov. 5, 2001

(65) Prior Publication Data

US 2003/0085367 A1 May 8, 2003

(51) Int. Cl.[7] .................................................... G01J 1/32
(52) U.S. Cl. .................... 250/205; 250/556; 250/214 R
(58) Field of Search ................................ 250/205, 556, 250/214 R; 209/534, 587; 356/71

(56) References Cited

U.S. PATENT DOCUMENTS 3,956,628 A * 5/1976 Hanger ....................... 250/205
5,430,289 A * 7/1995 Erickson et al. ............ 250/205
5,434,427 A * 7/1995 Crane et al. ................ 250/556
5,693,931 A * 12/1997 Wade ......................... 250/205
6,310,683 B1 * 10/2001 Fujiwara et al. .............. 356/71
6,426,509 B1 * 7/2002 Itako ..................... 250/559.44

* cited by examiner

*Primary Examiner*—Que T. Le
*Assistant Examiner*—Eric Spears
(74) *Attorney, Agent, or Firm*—Rabin & Berdo, P.C.

(57) ABSTRACT

A paper currency recognition system used in a money exchange machine includes a LED type transmitter unit and a phototransistor type receiver unit controlled by a CPU. The receiver unit also includes an N-channel MOSFET. When a variation in the induction or signal current from the receiver unit is detected, the CPU controls the MOSFET to let a part of the induction current be shunt to the MOSFET, enabling the value of the induction current to be regulated to a readable range, and at the same time drives a control chip of the receiver unit to regulate the LED driving current, keeping the light intensity of the LED within a constant value.

5 Claims, 3 Drawing Sheets

PAPER CURRENCY RECOGNITION SYSTEM

BACKGROUND OF THE INVENTION

The present invention relates to a paper currency recognition system for use in a money exchange machine and, more particularly, to a paper currency recognition system which automatically regulates the LED driving voltage and the signal or induction current of a phototransistor so that the intensity of light of the transmitter is constantly maintained within a constant value, and the induction current of the receiver is constantly maintained within a readable range.

A money exchange machine has a paper currency recognition system adapted for recognizing the authenticity of the inserted paper currency. The paper currency recognition system is installed in a transferring mechanism downstream of the currency insertion slot. When paper currency is inserted through the currency insertion slot into the transferring mechanism, a transmitter unit of the paper currency recognition system emits a light onto the inserted paper currency, and a receiver unit of the paper currency recognition system receives the light reflected from the inserted paper currency. When the reflected light is received from the inserted paper currency, the receiver unit produces a signal current readable by a CPU of the paper currency recognition system for recognizing the authenticity of the inserted paper currency. The transmitter unit of the paper currency recognition system uses an LED (light emitting diode) as the light source. The receiver unit of the paper currency recognition system uses a phototransistor to produce the signal current from the light reflected from the inserted paper currency. This design of a paper currency recognition system is still not satisfactory in function because the LED attenuates with use. After a long use, the intensity of light of the LED becomes relatively reduced, resulting in a recognition error.

SUMMARY OF THE INVENTION

The present invention provides a paper currency recognition system which eliminates the aforesaid problem. According to the present invention, the paper currency recognition system is used in a money exchange machine and is adapted to recognize the authenticity of paper currency that has been inserted into the money exchange machine, and comprises a transmitter unit, a receiver unit, and a CPU (central processing unit) controlling the operation of the transmitter unit and the receiver unit. The transmitter unit comprises a LED (light emitting diode) adapted for emitting light onto paper currency that has been inserted into the money exchange machine, and a control chip adapted for providing a driving current to drive the LED. The receiver unit comprises a phototransistor, which produces an induction or signal current from the light emitted from the LED and reflected by the paper currency, and an N-channel MOSFET (metal-oxide-semiconductor field effect transistor). When a variation of the signal current from the receiver unit is detected, the CPU controls the MOSFET to let a part of the induction current be shunt to the MOSFET, enabling the value of the induction current to be regulated to a readable range, and at the same time drives a control chip to regulate the LED driving current, keeping the light intensity of the LED to be maintained within a constant value.

DETAILED DESCRIPTION OF THE PREFERRED EMBODIMENT

Figure 1:
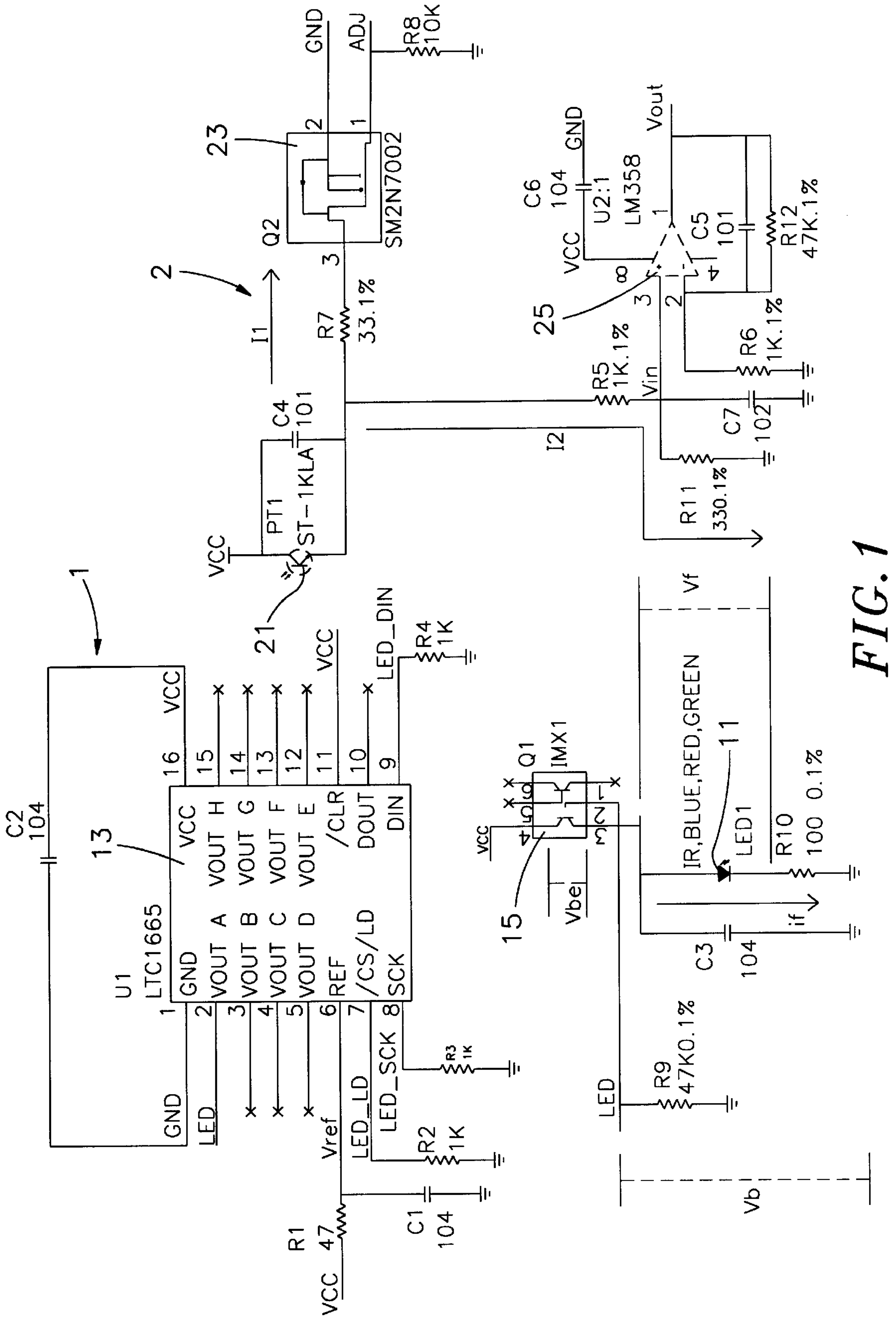
FIG. 1 is a circuit diagram of a paper currency recognition system according to the present invention.

Referring to FIG. 1, a paper currency recognition system in accordance with the present invention is generally comprised of a transmitter unit 1, a receiver unit 2, and a CPU (not shown). The transmitter unit 1 comprises a LED (light emitting diode) 11, and a control chip 13. The receiver unit 2 comprises a phototransistor 21, and a MOSFET (metal-oxide-semiconductor field effect transistor) 23. The MOSFET 23 is an N-channel MOSFET. When a variation of the output of the signal current induced by the receiver unit 2 is detected, the CPU of the system immediately controls the MOSFET 23 to let a part of the induction or signal current be shunt to the MOSFET 23, enabling the value of the induction current to be regulated to a readable range, and at the same time drives the control chip 13 to regulate the LED driving current, keeping the light intensity of the LED 11 within a constant value.

Referring to FIG. 1 again, the transmitter unit 1 further comprises a NPN transistor 15. The NPN transistor 15 has its emitter connected to the LED 11, and its input (base) connected to Vout of the control chip 13, enabling the driving voltage provided by the control chip 13 to be transmitted to the NPN transistor 15, causing the NPN transistor 15 to drive the LED 11. The NPN transistor 15 has a bias resistor R9 connected thereto, and the LED 11 is connected in series to a resistor R10, so that the CPU of the system can provides a reference voltage Vref to the control chip 13, causing the control chip 13 to frequently change the driving current If of the LED 11 subject to the formula of: If=(Vb−Vbe−Vf)/R10 (where Vb is the total voltage value provided by the control chip 13; Vbe is a voltage drop of the NPN transistor 15; Vf is the voltage drop of the LED 11; R10 is the resistance value of the resistor R10), keeping the light intensity of the LED 11 in the workable range.

Referring to FIG. 1 again, Vf value varies with the type of the LED 11 (for example, infrared, red, blue, and green LEDs have different Vf values).

According to this embodiment, the control chip 13 is a 8-bit control chip providing 8 independent channel outputs (VoutA~VoutH), a common Vref input (pin6 shown in FIG. 1), a data input end (pin 9, DIN, shown in FIG. 1), and a serial interface (pin7, /CS/LD, shown in FIG. 1). When the potential of the serial interface is low, SCK (pin8 shown in FIG. 1) of the control chip 13 transfers data from data input end (DIN) to the register (not shown), and at the same time the output voltage of the 8 independent channel outputs is changed.

Referring to FIG. 1 again, the phototransistor 21 produces an induction or signal current when induced by light from the LED 11, which induction current is directly proportional to the intensity of light from the LED 11. The induction current is sent from the phototransistor 21 to a series resistor circuit (R5 and R11 shown in FIG. 1) and Vin of a non-invertible OP (operational amplifier) 25 (see pin3 in FIG. 1), (non-invertible OP 25 provides a shunt voltage by means of resistor R11). The value of the voltage at the output end (pin1 shown in FIG. 1) of the non-invertible OP 25: Vout=Vin×(1+(R12/R6)), is directly proportional to the induction current of the phototransistor 21. When the voltage value Vout of the non-invertible OP 25 is not readable, the CPU of the system immediately controls the ADJ end (pin1 shown in FIG. 1) of the MOSFET 23 to short the circuit between pin3 and pin2 of the MOSFET 23, thereby causing a part of the induction current (See 11 in FIG. 1) to be shunted to the MOSFET 23, so that the value of the induction current is regulated to the readable range.

Figure 2:
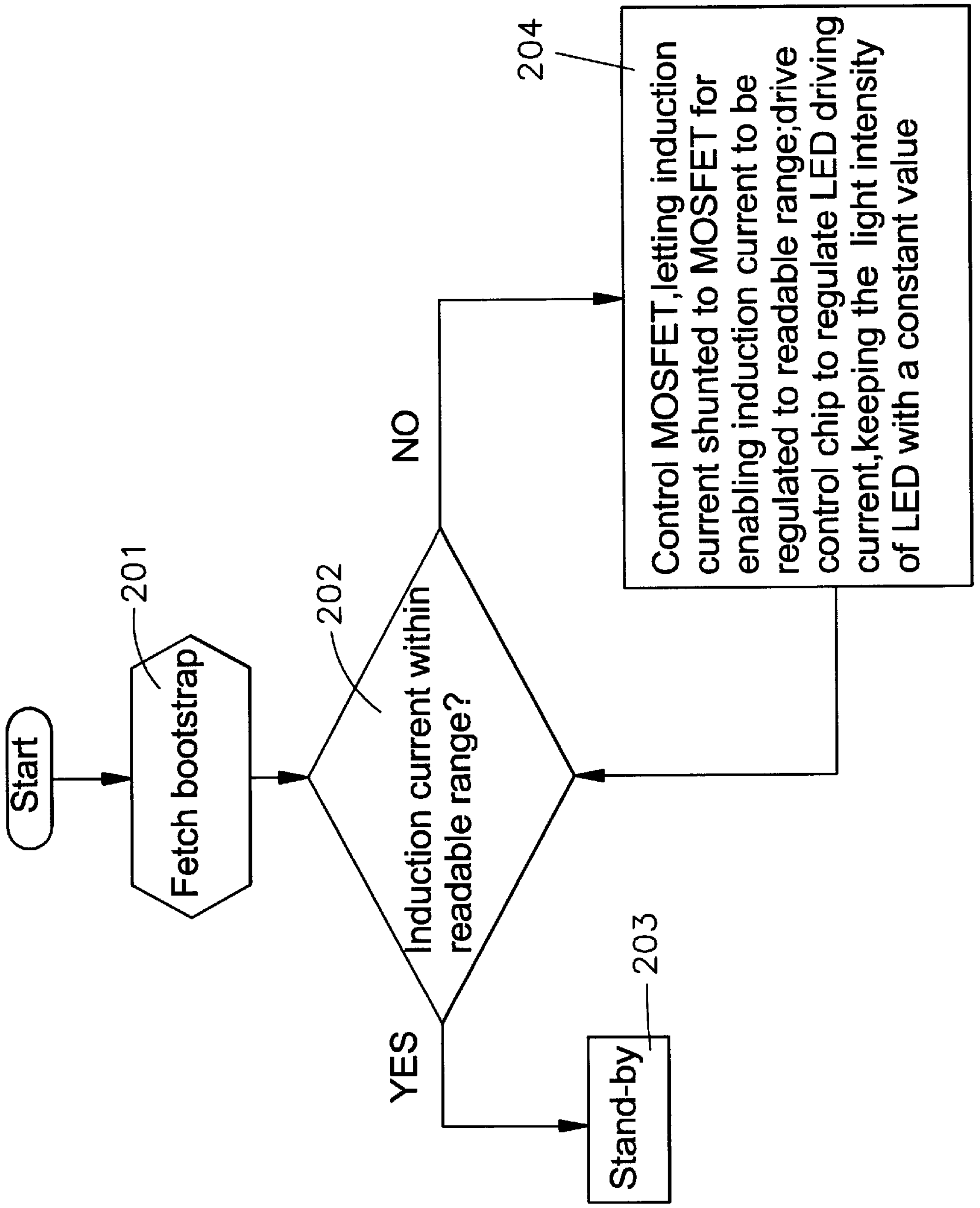
FIG. 2 is an operational flowchart of the paper currency recognition system.

Referring to FIG. 2, when the power of the paper currency recognition system turned on, the CPU of the system runs subject to the following steps:

(201) fetching the bootstrap from the memory;

(202) judging if the value of the induction current is within the readable range or not?; and then proceeding to step (203) if positive, or step (204) if negative;

(203) entering stand-by mode, ready to take in the inserted paper currency;

(204) starting the MOSFET 23 to let the induction current be partially shunted to the MOSFET 23, so as to further let the induction current be regulated to the readable range, and at the same time controlling the control chip 13 to regulate the driving current to drive LED 11, keeping the intensity of the emitted light of the LED 11 at the set value.

Figure 3:
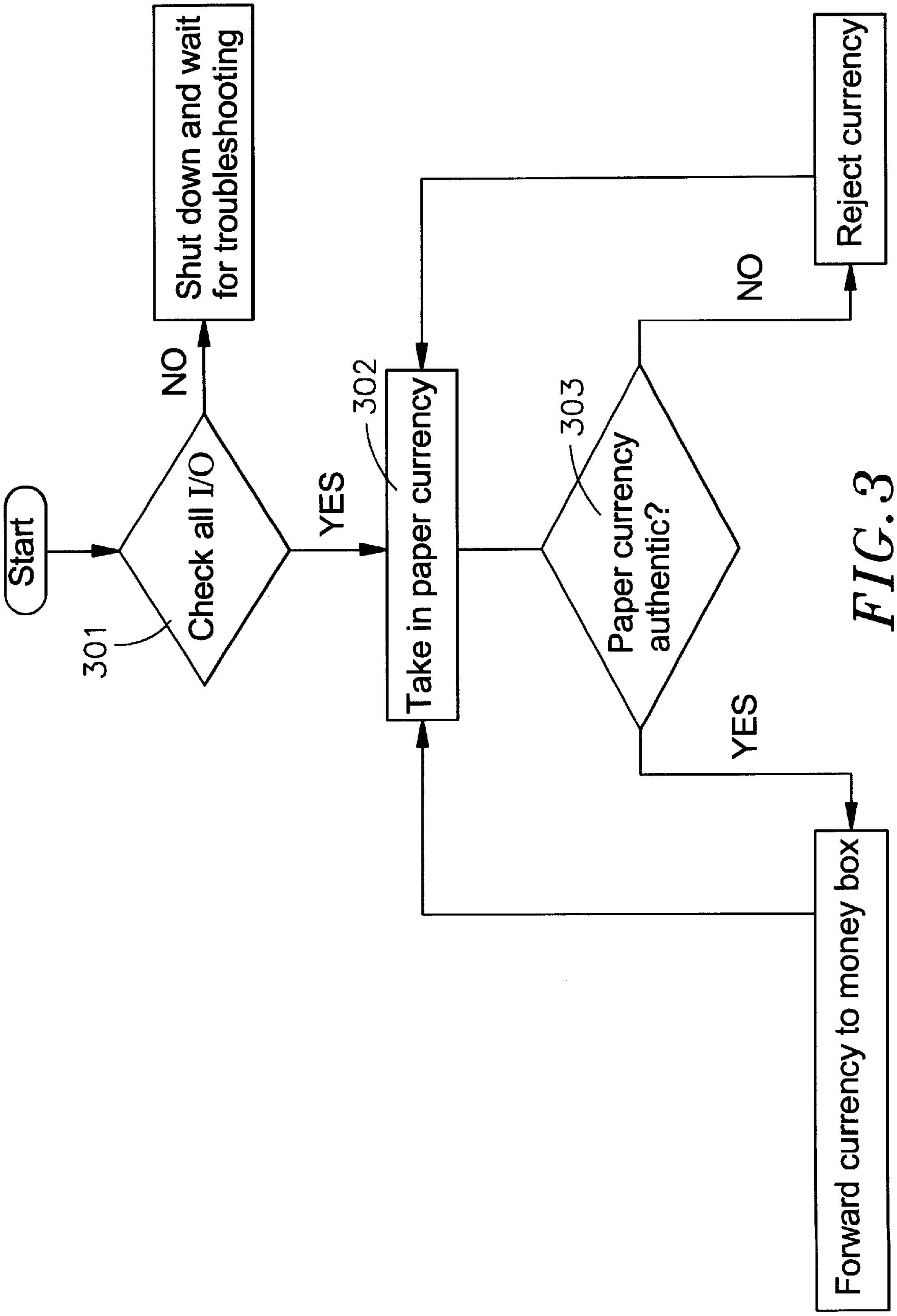
FIG. 3 is an operational flowchart of the present invention showing the paper currency recognition procedure of the paper currency recognition system.

Referring to FIG. 3, when the procedure of recognizing the intake paper currency is started, the CPU of the system runs subject to the following steps:

(301) sending address signal to all I/O (input/output) systems to check normal functioning of all peripheral equipment of the money exchange machine, and then proceeding to the following steps if positive, or shutting down the machine to wait for troubleshooting;

(302) driving the transferring mechanism to transfer the inserted paper currency forwardly into the inside of the money exchange machine;

(303) judging the authenticity of the intake paper currency subject to the induced or signal current value, and then forwarding the intake paper currency to the money box and returning to step (302) if positive, or rejecting the intake paper currency and returning to step (302) if negative. At the same time, the CPU of the system judges if the value of the induction current is within the readable range or not.

If the value of the induction current is not within the readable range, the CPU of the system immediately starts the MOSFET 23 to let the induction current be partially shunted to the readable range, and at the same time drives the control chip 13 to regulate the driving current, keeping the intensity of the emitted light of the LED 11 at the set value.

By means of the aforesaid arrangement, the LED 11 emits a constant intensity of light to the intake paper currency during paper currency recognition, and the induction current of the phototransistor 21 induced by reflected light from the intake paper currency is maintained within the readable range, enabling the paper currency recognition system to make an accurate recognition.

A prototype of a paper currency recognition system has been constructed with the features of the annexed drawings of FIGS. 1~3. The paper currency recognition system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A paper currency recognition system used in a money exchange machine and adapted to recognize the authenticity of the paper currency which has been inserted into the money exchange machine, the paper currency recognition system comprising:

a transmitter unit, a receiver unit, and a CPU (central processing unit) controlling the operation of said transmitter unit and said receiver unit, wherein said transmitter unit comprises at least one LED (light emitting diode) adapted for emitting light onto the paper currency which has been inserted into the money exchange machine, and a control chip adapted for providing a driving current to drive said at least one LED, wherein said receiver unit comprises at least one phototransistor, which produces a signal current when induced by the light emitted from said at least one LED and reflected by the paper currency which has been inserted into the money exchange machine, and a MOSFET (metal-oxide-semiconductor field effect transistor), and wherein, when a variation of the signal current from said receiver unit is detected, said CPU controls said MOSFET to let a part of the signal current be shunted to said MOSFET, enabling the value of the signal current to be regulated to a readable range, and at the same time drives said control chip to regulate the LED driving current, keeping the light intensity of said at least one LED within a constant value.

2. The paper currency recognition system as claimed in claim 1, wherein said transmitter unit further comprises a NPN transistor, said NPN transistor having the emitter thereof connected to said at least one LED and the base thereof connected to a voltage output end of said control chip, for enabling the driving voltage of the LED driving current to be transmitted from said control chip to said NPN transistor to drive said at least one LED, keeping the intensity of light of said at least one LED within a set working range.

3. The paper currency recognition system as claimed in claim 1, wherein said control chip is a 8-bit control chip providing 8 independent channel outputs, a common reference voltage input, and a serial interface.

4. The paper currency recognition system as claimed in claim 1, wherein said receiver unit further comprises a series resistor circuit and a non-inverting amplifier that includes an operational amplifier, wherein the signal current produced by said phototransistor is directly proportional to the intensity of the reflected light received by said phototransistor, and is transmitted to said series resistor circuit and to an input of said non-inverting amplifier, and wherein, when the output voltage of said non-inverting amplifier is not readable to said CPU, said CPU controls said MOSFET to conduct, enabling the signal current to be shunted to said MOSFET and regulated to a readable range.

5. The paper currency recognition system as claimed in claim 1, wherein said MOSFET is an N-channel MOSFET.

* * * * *